United States Patent
Kichikawa et al.

(10) Patent No.: US 11,094,155 B2
(45) Date of Patent: Aug. 17, 2021

(54) BILL HANDLING MACHINE AND BILL HANDLING METHOD

(71) Applicant: Hitachi-Omron Terminal Solutions, Corp., Tokyo (JP)

(72) Inventors: Yuki Kichikawa, Tokyo (JP); Yukihiro Mabuchi, Tokyo (JP); Shinya Miwa, Tokyo (JP)

(73) Assignee: HITACHI-OMRON TERMINAL SOLUTIONS, CORP., Tokyo (JP)

( * ) Notice: Subject to any disclaimer, the term of this patent is extended or adjusted under 35 U.S.C. 154(b) by 174 days.

(21) Appl. No.: 16/236,818

(22) Filed: Dec. 31, 2018

(65) Prior Publication Data

US 2019/0311585 A1 Oct. 10, 2019

(30) Foreign Application Priority Data

Apr. 4, 2018 (JP) .............................. JP2018-072128

(51) Int. Cl.
| | |
|---|---|
| *G07D 11/20* | (2019.01) |
| *G07D 11/14* | (2019.01) |
| *G06Q 20/20* | (2012.01) |
| *G07F 19/00* | (2006.01) |
| *G06Q 20/10* | (2012.01) |
| *G06Q 20/18* | (2012.01) |

(52) U.S. Cl.
CPC .......... *G07D 11/20* (2019.01); *G06Q 20/102* (2013.01); *G06Q 20/18* (2013.01); *G06Q 20/20* (2013.01); *G07D 11/14* (2019.01); *G07F 19/202* (2013.01); *G07F 19/203* (2013.01)

(58) Field of Classification Search
CPC ...................................................... G07D 11/20
See application file for complete search history.

(56) References Cited

U.S. PATENT DOCUMENTS

| | | | | |
|---|---|---|---|---|
| 4,962,919 A | * | 10/1990 | Azuchi | .................. G07D 11/25 271/3.01 |
| 7,497,339 B2 | * | 3/2009 | Nagura | ................... G07F 19/20 209/534 |

(Continued)

FOREIGN PATENT DOCUMENTS

| | | |
|---|---|---|
| CN | 105976537 A | 9/2016 |
| CN | 106327667 A | 1/2017 |
| JP | 2016-29518 A | 3/2016 |

OTHER PUBLICATIONS

Office Action issued in corresponding Chinese Patent Application No. 201811557006.3 dated Nov. 19, 2020.

*Primary Examiner* — Thomas Randazzo (74) *Attorney, Agent, or Firm* — Foley & Lardner LLP (57) ABSTRACT

The present invention makes it possible to restrain a bill from being taken out from a money withdrawal section during a transaction while the convenience of a conventional bill handling machine is maintained. The present invention is a bill handling machine to deposit and withdraw a bill with a customer over the counter, and the bill handling machine includes: a money deposit section having a money deposit opening to deposit a bill; a money withdrawal section arranged adjacently to the money deposit section and having a money withdrawal opening to withdraw a bill and a shutter to open and close the money withdrawal opening; and a control section to transport a reject bill to the money withdrawal opening.

7 Claims, 9 Drawing Sheets

(56) References Cited

U.S. PATENT DOCUMENTS

| | | | |
|---|---|---|---|
| 2004/0222283 A1* | 11/2004 | Mastie | G06Q 20/40 235/379 |
| 2011/0036682 A1* | 2/2011 | Koyano | G07F 19/202 194/206 |
| 2013/0232064 A1* | 9/2013 | Bosch | G07F 19/20 705/43 |
| 2014/0290539 A1* | 10/2014 | Tagashira | G06Q 20/20 109/53 |
| 2015/0100480 A1* | 4/2015 | Colvin | G07D 11/30 705/39 |
| 2016/0048817 A1* | 2/2016 | Koeppel | G06Q 40/02 705/43 |
| 2017/0076260 A1* | 3/2017 | Ishikawa | G06Q 20/4014 |
| 2017/0169647 A1* | 6/2017 | Ono | G07D 11/20 |
| 2017/0249807 A1* | 8/2017 | Kanbayashi | G07F 19/202 |
| 2017/0309133 A1* | 10/2017 | Okamoto | B65H 31/24 |
| 2018/0082509 A1* | 3/2018 | Fujita | B65H 31/24 |
| 2018/0137490 A1* | 5/2018 | Yasui | G07F 19/203 |
| 2018/0290849 A1* | 10/2018 | Hosokawa | B65H 5/062 |

\* cited by examiner

BILL HANDLING MACHINE AND BILL HANDLING METHOD

CLAIM OF PRIORITY

The present application claims priority from Japanese application serial no. JP2018-072128, filed on Apr. 4, 2018, the content of which is hereby incorporated by reference into this application.

BACKGROUND

The present invention relates to a bill handling machine and a bill handling method for transporting a bill.

RELATED ART

As a bill handling machine, there is a machine having a money deposit section to deposit a bill and a money withdrawal section to serve both as a transport destination of a withdrawn bill and as a transport destination of a reject bill. As a bill handling machine of this configuration, a machine having no shutter at a money deposit section and a money withdrawal section serves. In a bill handling machine having no shutter, both a money deposit section and a money withdrawal section are open and a reject bill in a money deposit transaction can be redeposited immediately from the money withdrawal section to the money deposit section. Further, an open money deposit section can accumulate bills and can deposit a large number of bills at a time. From such a feature, such a bill handling machine is used as a high-speed teller machine for counter services in a bank (for example, Japanese Patent Unexamined Application Publication No. 2016-29518).

SUMMARY OF THE INVENTION

There is a desire to use such a bill handling machine not only for counter services in a bank but also in the form of a customer to directly manipulate like an ATM. When a customer manipulates a bill handling machine however, that a bill in a money withdrawal section can be taken out at any time is a problem sometimes. For example, when a bill handling machine abnormally stops during a money withdrawal transaction, a customer may possibly take out a bill withdrawn at the money withdrawal section and leave without waiting for restoration.

As means for solving such a problem, there is means of installing a shutter at a money depositing and withdrawing section of a bill and restricting a customer's manipulation for the money depositing and withdrawing section by the shutter like an ATM manipulated directly by a customer. By merely installing shutters at a money deposit section and a money withdrawal section, however, the aforementioned convenience of being able to deposit a large number of bills at a time and being able to immediately redeposit a deposit-reject bill may undesirably be lost.

In view of the above situation, an object of the present applied invention is to provide a bill handling machine and a bill handling method capable of restraining a bill from being taken out from a money withdrawal section during a transaction while the convenience of a conventional bill handling machine is maintained.

A bill handling machine according to the present invention is a bill handling machine to deposit and withdraw a bill with a customer over the counter and is configured as a bill handling machine including: a money deposit section having a money deposit opening to deposit the bill; a money withdrawal section arranged adjacently to the money deposit section and has a money withdrawal opening to withdraw the bill and a shutter to open and close the money withdrawal opening; and a control section to transport a reject bill into the money withdrawal opening.

The present invention makes it possible to restrain a bill from being taken out from a money withdrawal section during a transaction while the convenience of a conventional bill handling machine is maintained.

DETAILED DESCRIPTION OF THE PREFERRED EMBODIMENTS

First Embodiment

Figure 1:
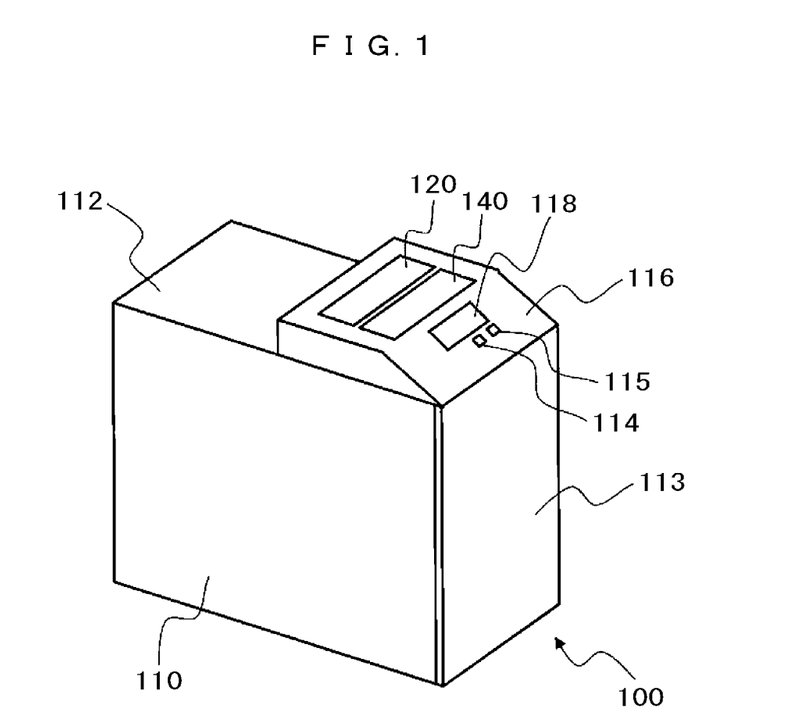
FIG. 1 is a perspective view showing a general appearance of a bill handling machine according to a first embodiment.
Figure 2:
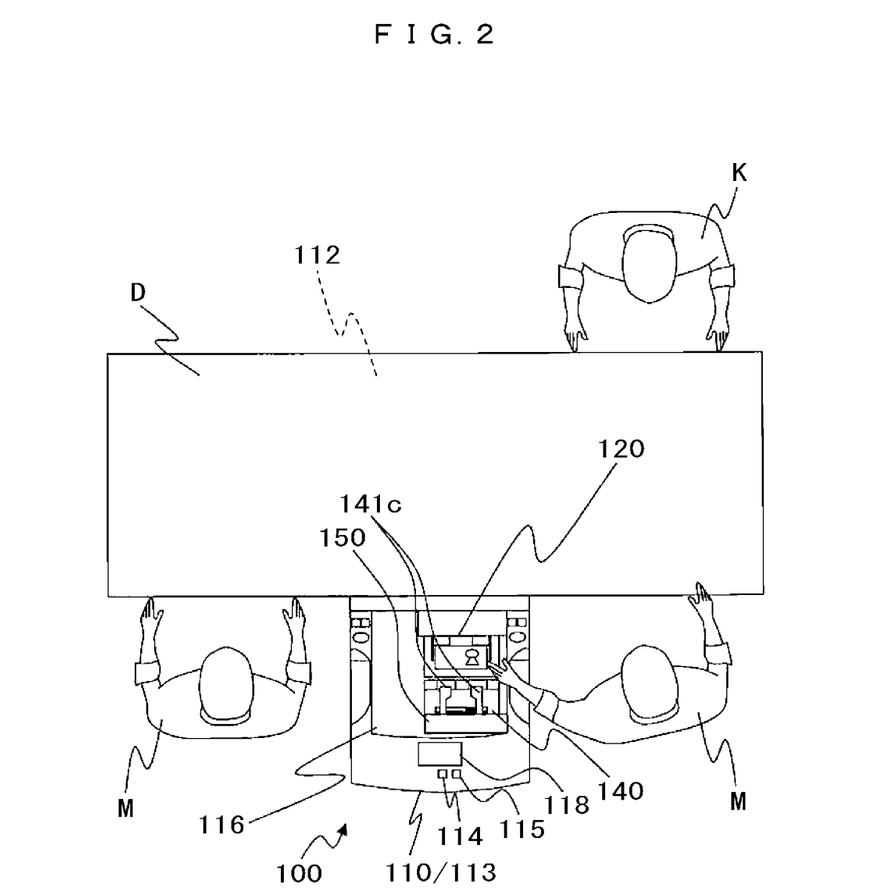
FIG. 2 is an explanatory view schematically showing the positional relationship between a counter clerk M and a customer K in a plan view of a bill handling machine according to the first embodiment.
Figure 3:
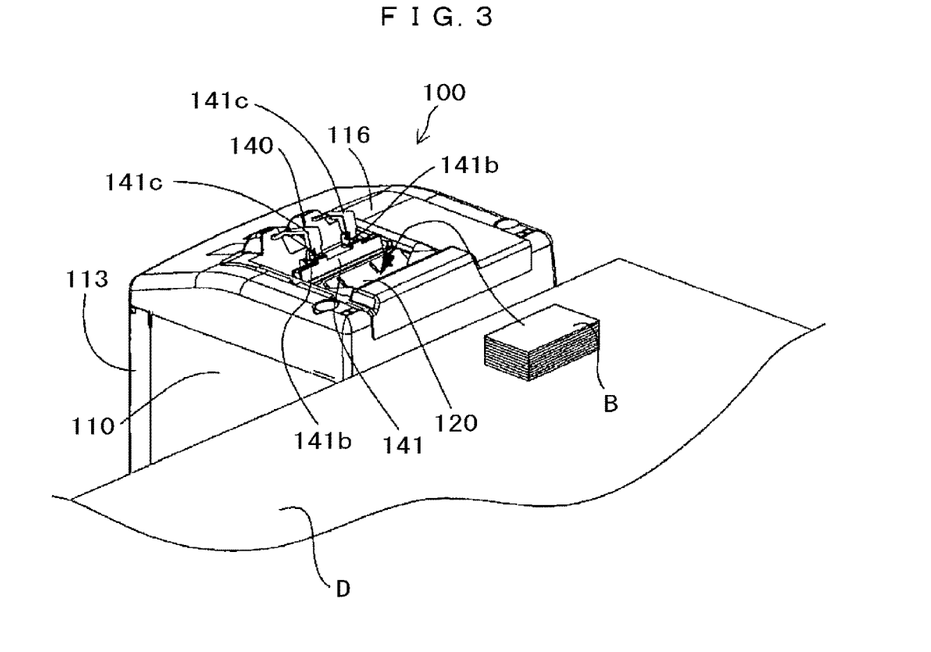
FIG. 3 is a perspective view schematically showing the upper region of a bill handling machine according to the first embodiment.

A general configuration is explained. FIG. 1 is a perspective view showing an appearance of a bill handling machine 100 according to the present embodiment, FIG. 2 is an explanatory view schematically showing a positional relationship between a counter clerk M and a customer K in a plan view of the bill handling machine 100, and FIG. 3 is a perspective view of the upper region of the bill handling machine 100 viewed from the rear side of the bill handling machine 100. As shown in FIG. 1, the bill handling machine 100 is distinguished between an upper region and a lower region from the appearance and the lower region is used as a safe 110 and the upper region above a housing section 112 constituting the safe 110 is used as a money depositing and withdrawing mechanism section 116. The housing section 112: is formed with a steel plate; has a safe door 113 that is made of a metal, capable of opening and closing, and lockable on the front side in FIG. 1; and constitutes the safe 110 together with the safe door 113. The bill handling machine 100: contains a bill identification section 170, a bill storage section 200, those being described later, and others in the housing section 112 closed by the safe door 113; and ensures security.

Further, the money depositing and withdrawing mechanism section 116: has an operation panel 118 that is an operation section operated by a counter clerk, a money deposit button 114, and a money withdrawal button 115; and additionally has a money deposit section 120 and a money withdrawal section 140, those being described later, adjacently on the top surface in the order of the money withdrawal section 140 and then the money deposit section 120 from the front side to the deep side in FIG. 1, in other words from the front side to the rear side of the machine. Furthermore, the bill handling machine 100 is configured so that the rear side of the machine may be covered with a customer correspondence table D and the money deposit section 120 and the money withdrawal section 140 of the money depositing and withdrawing mechanism section 116 may be visible by a customer K as shown in FIG. 2. The situation of being viewed by the customer K is shown in FIG. 3 and the bill handling machine 100 has the money deposit section 120 and the money withdrawal section 140 adjacently in this order from the side of the customer K in the money depositing and withdrawing mechanism section 116. As a result, a configuration of allowing the customer K to deposit a bill into the money deposit section 120 easily is established. As shown in FIG. 2 further, the counter clerk M faces the customer K with the customer correspondence table D interposed and carries out: prescribed operations of the operation panel 118; press of the money deposit button 114 and a money withdrawal button 115; and deposit of a bill B entrusted by the customer K into the money deposit section 120 and delivery of a bill withdrawn to the money withdrawal section 140 to the customer K. A configuration of the bill handling machine 100 is described hereunder in detail.

Figure 4:
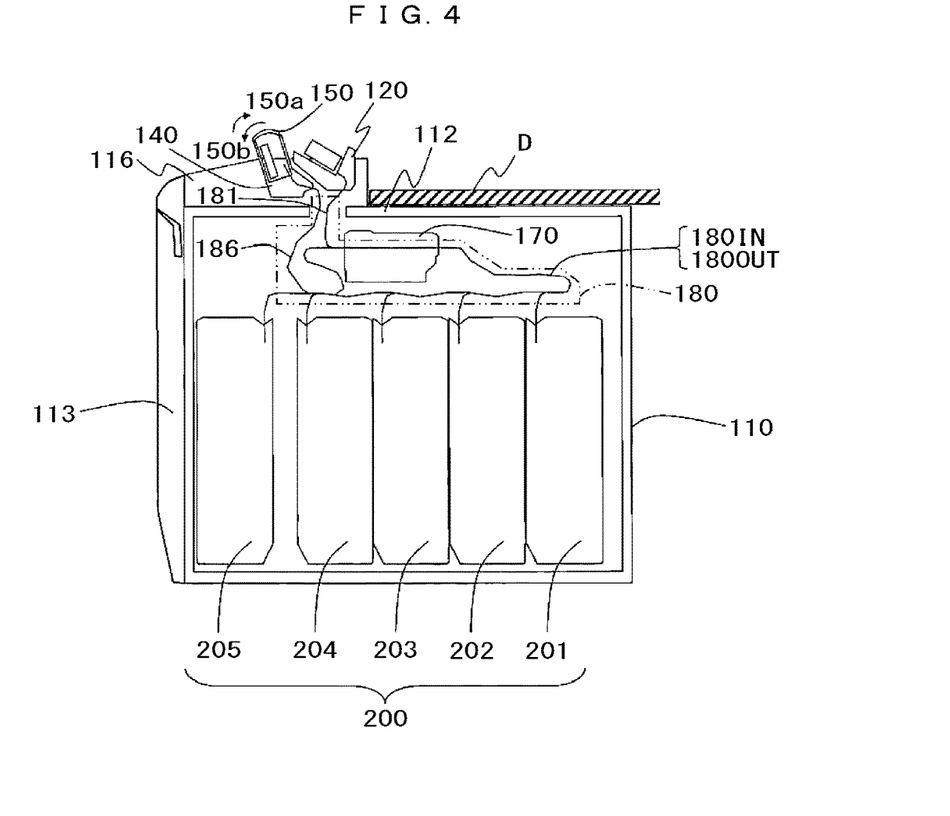
FIG. 4 is a sectional view schematically showing an internal configuration and a bill transport route of a bill handling machine according to the first embodiment.

FIG. 4 is a sectional view schematically showing an internal configuration and a bill transport route of the bill handling machine 100. As shown in the figure, the bill handling machine 100: has the money deposit section 120 to deposit a bill B and the money withdrawal section 140 to withdraw a bill B in an adjacently arranged manner in the money depositing and withdrawing mechanism section 116 described above; and has the bill identification section 170, a transport mechanism section 180, and the bill storage section 200 in a contained manner in the housing section 112 of the safe 110. The bill identification section 170 and the bill storage section 200 contained in the safe 110 in this way are partitioned by the housing section 112 from the money deposit section 120 and the money withdrawal section 140 of the money depositing and withdrawing mechanism section 116 and the bill identification section 170 is located above the bill storage section 200 in the housing section 112.

As shown in FIG. 3 further, the money deposit section 120 is arranged on the side closer to the bill identification section 170 than the money withdrawal section 140, in other words on the rear side, and the money deposit section 120 and the adjacently arranged money withdrawal section 140 have a wall section 141 on the side of the money deposit section 120. The wall section 141: covers the interior of the money withdrawal section 140 on the side of the money deposit section 120; and has lids 141c apart from each other in a base section 141b at the tip of the wall section 141. The lids 141c: cover the opening top of the money withdrawal section 140 in an openable and closable manner; and prevent a withdrawn bill transported toward the money withdrawal section 140 from flying out. The wall section 141 extends only up to the opening top of the money deposit section 120 and even the lids 141c are formed so as to have narrow widths. The wall section 141 and the lids 141c therefore do not block the line of sight when a customer K distanced by a customer correspondence table D (refer to FIG. 2) looks at the money withdrawal section 140 from the side of the money deposit section 120. Further, the lids 141c: are shaped so as to cover not the whole of the money withdrawal section 140 and have narrow widths; are arranged in the vicinities of the center position; hence do not interfere with the flow line of hand of a counter clerk M (refer to FIG. 2); thus do not hinder a bill B from being deposited into the money deposit section 120; and have good operability.

The bill identification section 170 forms a partial route of a first main transport route 183 (refer to FIG. 6) that constitutes the transport mechanism section 180 and will be described later. In other words, the first main transport route 183 passes through the bill identification section 170. Then the bill identification section 170 identifies a kind, a serial number, authenticity, a damage situation (necessity of reject), and others of a bill B transported through the first main transport route 183 during the course of depositing or withdrawing money. A bill B can be identified in the bill identification section 170 by using various kinds of information including image data obtained by scanning the bill B, an uneven shape of the surface of the bill B, magnetic properties, optical properties to ultraviolet light, and the like, for example. An identification result of the bill identification section 170 is outputted to a control section 300 (refer to FIG. 5) that will be described later and used for deciding a cassette of a bill transport destination, transporting a reject bill, and the like.

The transport mechanism section 180 corresponding to a transport section forms a bill deposit route 180IN and a bill withdrawal route 180OUT in the region from the money deposit section 120 and the money withdrawal section 140 to the bill storage section 200. Although both the routes are described later in detail, as shown in FIG. 4, the bill deposit route 180IN has an upstream side bill deposit route 181 ranging from the money deposit section 120 to the bill identification section 170. The bill withdrawal route 180OUT has a downstream side money withdrawal route 186 ranging from the bill identification section 170 to the money withdrawal section 140. The transport mechanism section 180 having those routes connects the money deposit section 120 and the money withdrawal section 140 to the bill identification section 170 and the bill storage section 200 and transports a bill through the money deposit and withdrawal routes. The bill storage section 200 has bill storage cassettes 201 to 205 and each of the bill storage cassettes 201 to 205 contains a bill B as described later.

Figure 5:
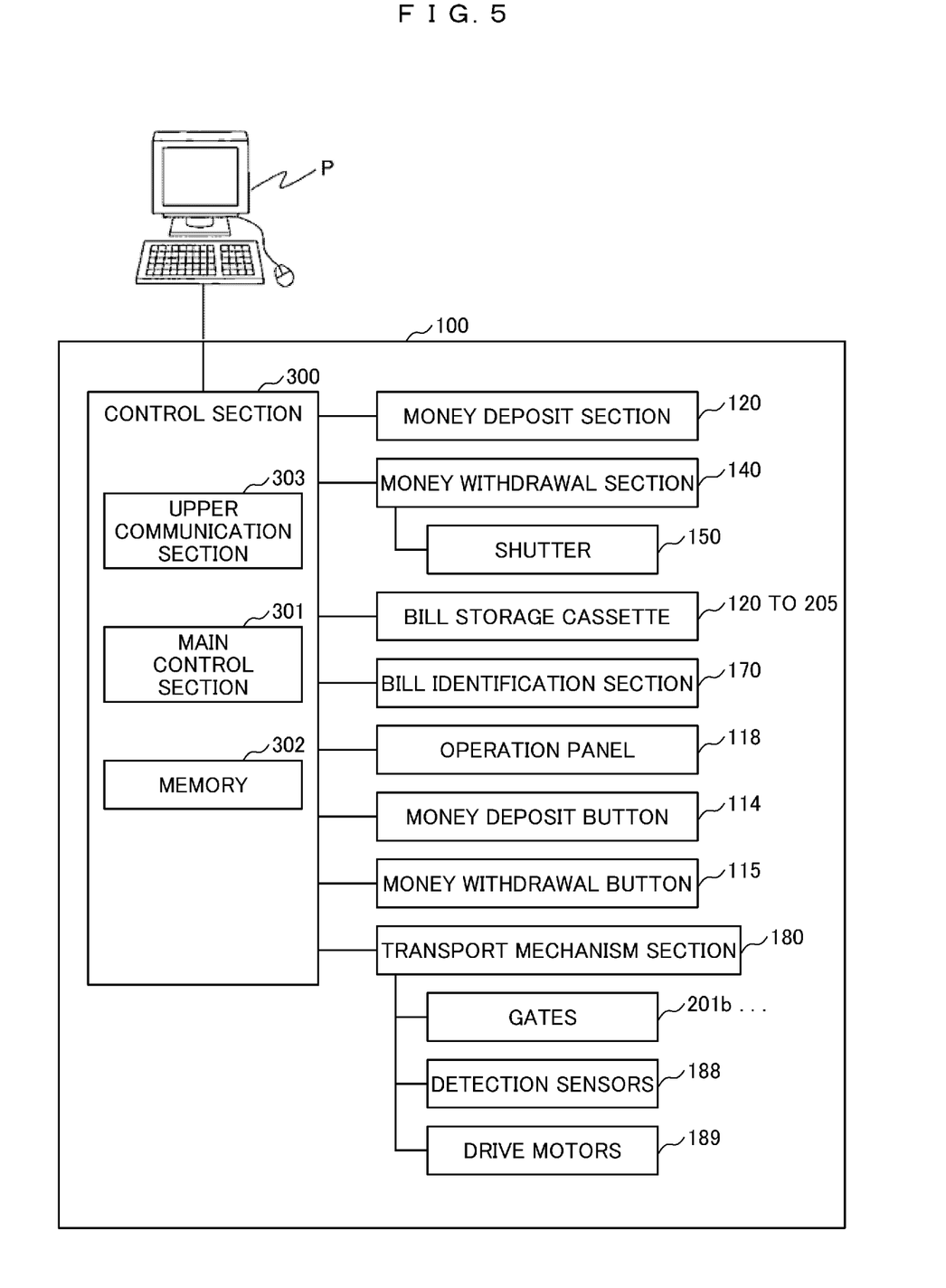
FIG. 5 is a control block diagram of a bill handling machine according to the first embodiment.

An electrical configuration is explained hereunder. Firstly, FIG. 5 is an explanatory view showing a control block of a bill handling machine 100. The bill handling machine 100 has, as electrical function blocks: a money deposit section 120, a money withdrawal section 140, bill storage cassettes 201 to 205 in a bill storage section 200, a bill identification section 170, an operation panel 118, a money deposit button 114, a money withdrawal button 115, a transport mechanism section 180, and a control section 300. The money withdrawal section 140 has a shutter 150 as described later. The transport mechanism section 180, as described later, has a gate group including gates 201b of respective cassettes, a detection sensor group of a plurality of detection sensors 188 installed in bill transport routes, and a drive motor group of a plurality of drive motors 189 for transporting a bill. The control section 300 has a main control section 301, a memory 302, and an upper communication section 303 capable of communicating with an operation terminal P. The main control section 301 includes mainly a microprocessor for control. The main control section 301 controls the drive of driving devices and other devices included in the money deposit section 120 and the money withdrawal section 140 and involved in sending and transporting a bill, the shutter 150 incorporated in the money withdrawal section 140, and the gate group and the drive motor group of the transport mechanism section 180 in accordance with the depositing and withdrawing transport of a bill. The detection sensors 188 included in the detection sensor group: detect a bill transport state in a bill deposit route 180IN and a bill withdrawal route 180OUT, those being described later; detect the presence or absence of a bill in the money deposit section 120 and the money withdrawal section 140, the number of bills stored in bill storage cassettes 201 to 205, and the like; and output a detected signal to the control section 300.

Figure 6:
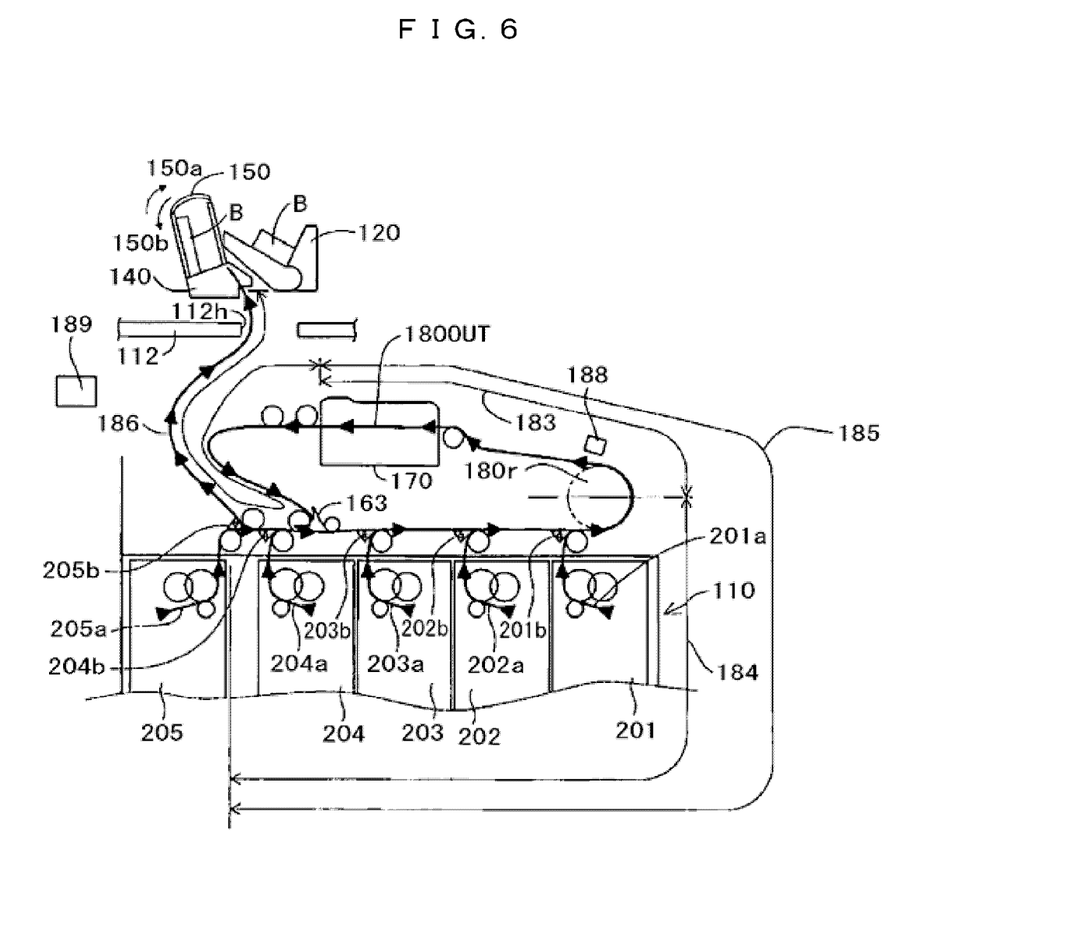
FIG. 6 is an explanatory view schematically explaining a route configuration related to money withdrawing transport in a configuration of a bill transport route according to the first embodiment.

Successively, money withdrawing and transporting processing is explained in reference to FIG. 6. The control section 300 that has received a money withdrawal instruction from an operation terminal P through the upper communication section 303 in FIG. 5: controls the drive motor group 189; and moves bills B of the number designated by the operation terminal P from the bill storage cassettes 201 to 205 toward the money withdrawal section 140. As an example, a transport route in the case of allocating a withdrawing bill reject box to the bill storage cassette 204 is explained. Bills sent out from the cassettes 201, 202, and 203 pass through an upstream side money withdrawal route 185 and whether a bill is a valid note or a reject note is judged at the bill identification section 170. A bill judged as a valid note passes through a downstream side money withdrawal route 186 via a gate 163 and is transported to the money withdrawal section 140. A bill judged as a reject note is transported to the withdrawing bill reject box of the cassette 204 through a gate 204b. When rejection occurs during money withdrawal therefore, bills reach the money withdrawal section 140 not continuously but disjointedly. Further, it is also possible to transport a reject note to the money withdrawal section 140. On this occasion, after bills of the number designated from the operation terminal P are transported from the bill storage cassettes 201 to 205 to the money withdrawal section 140, all the bills contained in the money withdrawal section 140, namely valid notes and reject notes, are transported to the withdrawing bill reject box and money withdrawal transaction is retried.

Figure 7:
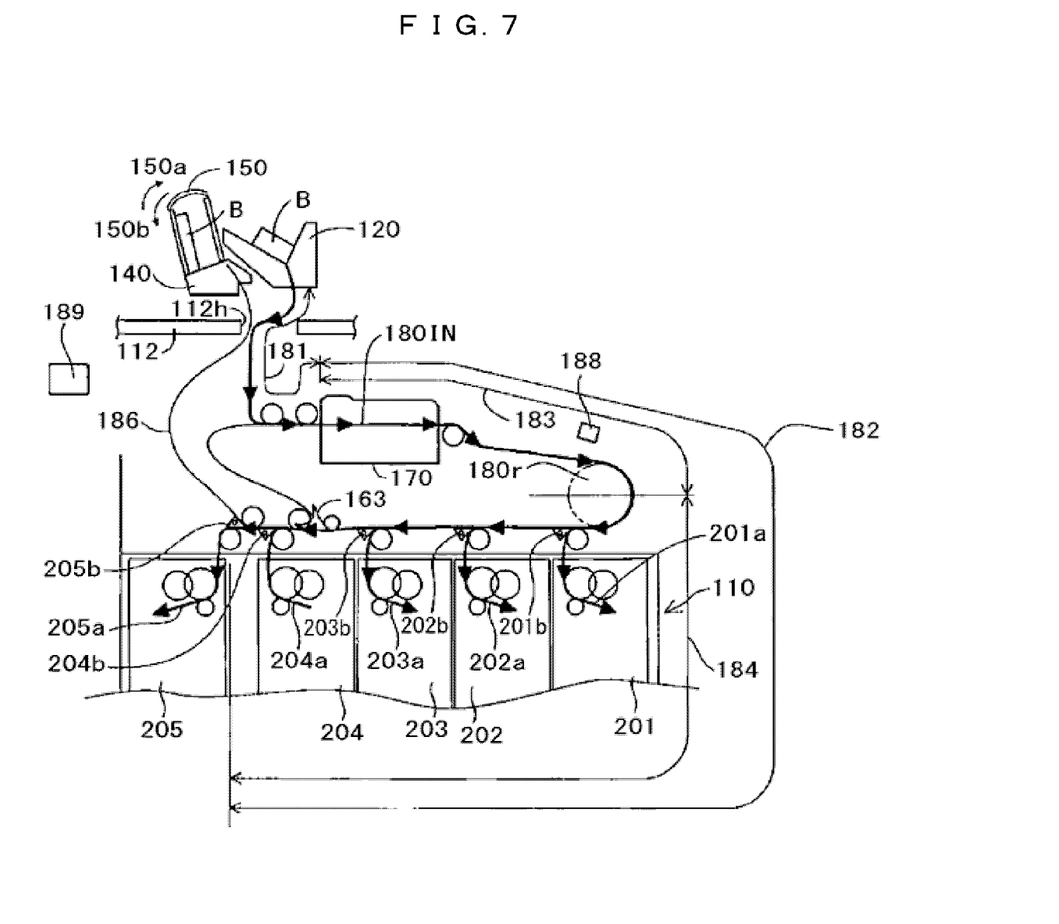
FIG. 7 is an explanatory view schematically explaining a route configuration related to money depositing transport in a configuration of a bill transport route according to the first embodiment.

Successively, money depositing and transporting processing is explained in reference to FIG. 7. As shown in FIG. 7, a bill deposit route 180IN extends from the money deposit section 120, goes through the housing section 112, and reaches the bill identification section 170. Successively, the bill deposit route 180IN folds back around a deflecting roller 180r on the downstream side of the bill identification section 170 and extends to the bill storage cassette 205 along the line of the cassettes in the bill storage section 200 located below the bill identification section 170. In the bill deposit route 180IN having such a path trajectory, the route from the money deposit section 120 to the bill identification section 170 is defined as an upstream side money deposit route 181 and the route on the more downstream side than the upstream side money deposit route 181 is defined as a downstream side money deposit route 182. In the transport mechanism section 180, the downstream side money deposit route 182 includes a first main transport route 183 passing through the bill identification section 170 and extending to the deflecting roller 180r and a second main transport route 184 folding back around the deflecting roller 180r, extending in the horizontal direction, and reaching the bill storage cassette 205 in the bill storage section 200. Bills B deposited into the money deposit section 120 are separated one by one and sent out to a transport route. The transport mechanism section 180 deposits and transports the bill B sent out to the transport route along the route of the bill deposit route 180IN and deposits and transports the bill B to any one of the bill storage cassettes 201 to 205 in response to the identification results of the bill identification section 170. A bill judged as a reject note by the bill identification section 170: passes through the downstream side money withdrawal route 186 via a gate 205b; and is transported to the money withdrawal section 140.

Successively, the operations of the shutter 150 are explained. As shown in FIG. 4, the money withdrawal section 140 has the shutter 150 on the upper side. The shutter 150, in a closed state: slides in the direction of an arrow 150a, in other words to the side of the money deposit section 120, by control of the main control section 301; covers the whole upper side of the money withdrawal section 140; and restricts operations such as takeout and deposit of a bill B and insertion of a hand. Further, the shutter 150, in an open state: slides in the direction of an arrow 150b, in other words to the side of the safe door 113, by control of the main control section 301; and makes operations toward the money withdrawal section 140 possible.

Although the shutter 150 is arc-shaped here as shown in FIG. 4, a shape of no arc is also acceptable. Further, although a state of sliding the shutter 150 toward the side of the safe door 113 is defined as an open state, it is also possible to define a state of sliding the shutter 150 toward the side of the money deposit section 120 or in the direction of the side of the machine as an open state.

Figure 8:
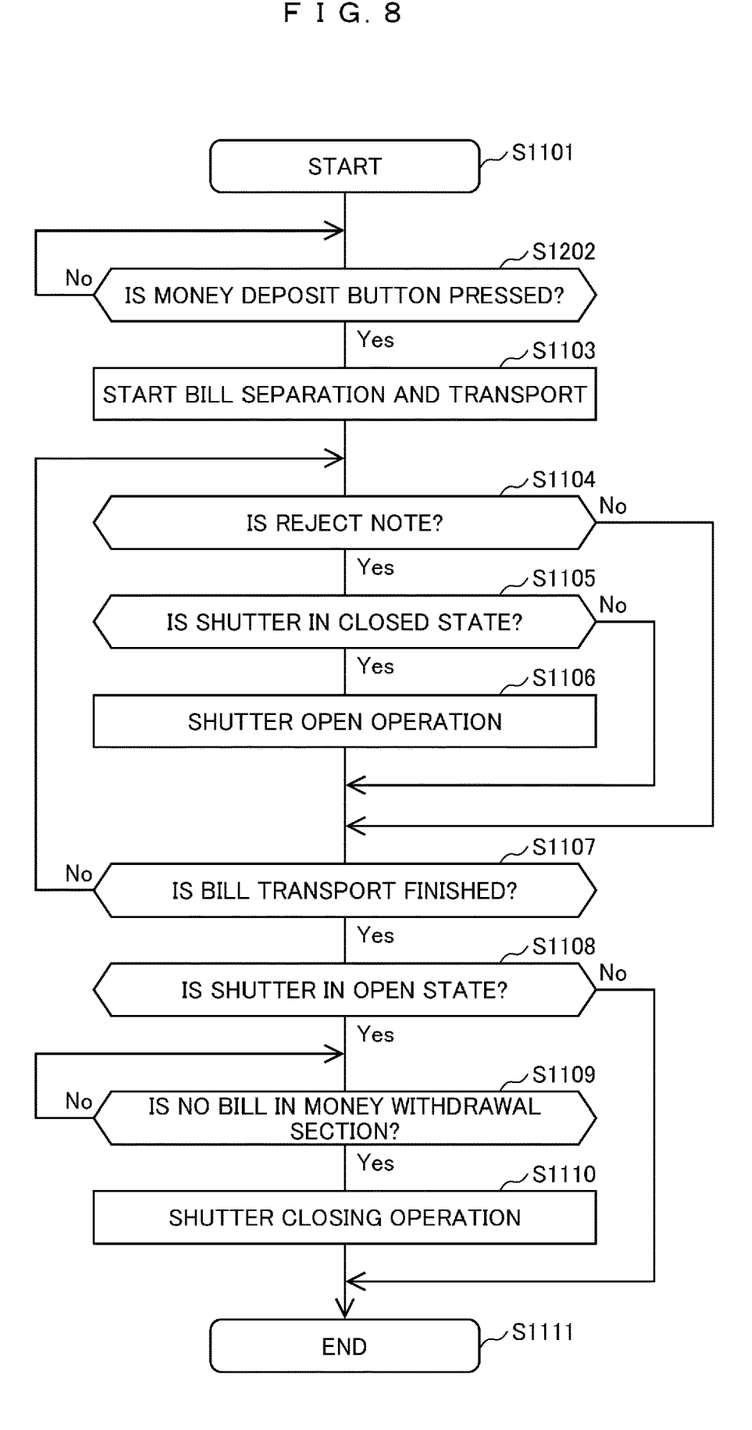
FIG. 8 is a control flow diagram of a money deposit transaction according to the first embodiment.

During bill transport or during wait, a bill can be restrained from being taken out during a money withdrawal transaction by shifting the shutter 150 to a closed state. On the other hand, during a money deposit transaction, when rejection occurs, a reject bill transported to the money withdrawal section 140 cannot be taken out until the bill transport finishes. Then the main control section 301, during the money deposit transaction, controls the shutter 150 so as to be open at the time of the occurrence of the rejection. A control (first control) flow of a money deposit transaction in the present embodiment is shown in FIG. 8. The operations and effects of opening the shutter 150 at the time of the occurrence of rejection are explained hereunder by taking a look at the flow of FIG. 8 in sequence.

When the bill handling machine 100 goes into a waiting state (S1101), the main control section 301 monitors the press of the money deposit button 114 (S1102). With the press of the money deposit button 114 by a customer, the main control section 301 controls the drive motor group 189 and starts the separation and transport of bills placed at the money deposit section 120 (S1103). During bill transport, the main control section 301 monitors the occurrence of rejection by looking at the identification results of the bill identification section 170 and judges whether or not each of the bills is a reject note (S1104). When a transported bill is judges as a reject note (Yes at S1104), the main control section 301: controls the shutter 150; judges whether or not the shutter 150 is in a closed state (S1105); and when the shutter 150 is judged as in a closed state (Yes at S1105), opens the shutter 150 (S1106). The main control section 301 continues the monitor until it judges that the transport of the bills has finished (Yes at S1107), in other words until all the bills deposited into the money deposit section 120 are transported to the bill storage section 200 or the money withdrawal section 140 (No at S1107). After the transport of the bills, the main control section 301 judges whether or not the shutter 150 is in an open state (S1108). The main control section 301, when it judges that the shutter 150 is in an open state (Yes at S1108), judges the presence or absence of a bill in the money withdrawal section 140 (S1109) and waits for all the reject bills transported in the money withdrawal section 140 to be taken out. The main control section 301, when it judges that no bill remains in the money withdrawal section 140 (Yes at S1109), closes the shutter 150 (S1110). Successively, the main control section 301 finishes the transaction (S1111).

By the above operations, when deposit rejection occurs, a counter clerk M or a customer K can immediately take out and redeposit a reject bill in the money deposit section 120 without waiting for the finish of the bill transport.

Although the occurrence of rejection and a timing of opening the shutter 150 are judged by the identification results of the bill identification section 170 here, it is also possible to: judge the occurrence of rejection at the time of accumulating bills in the money withdrawal section 140 during a money deposit transaction; and open the shutter 150.

Second Embodiment

Figure 9:
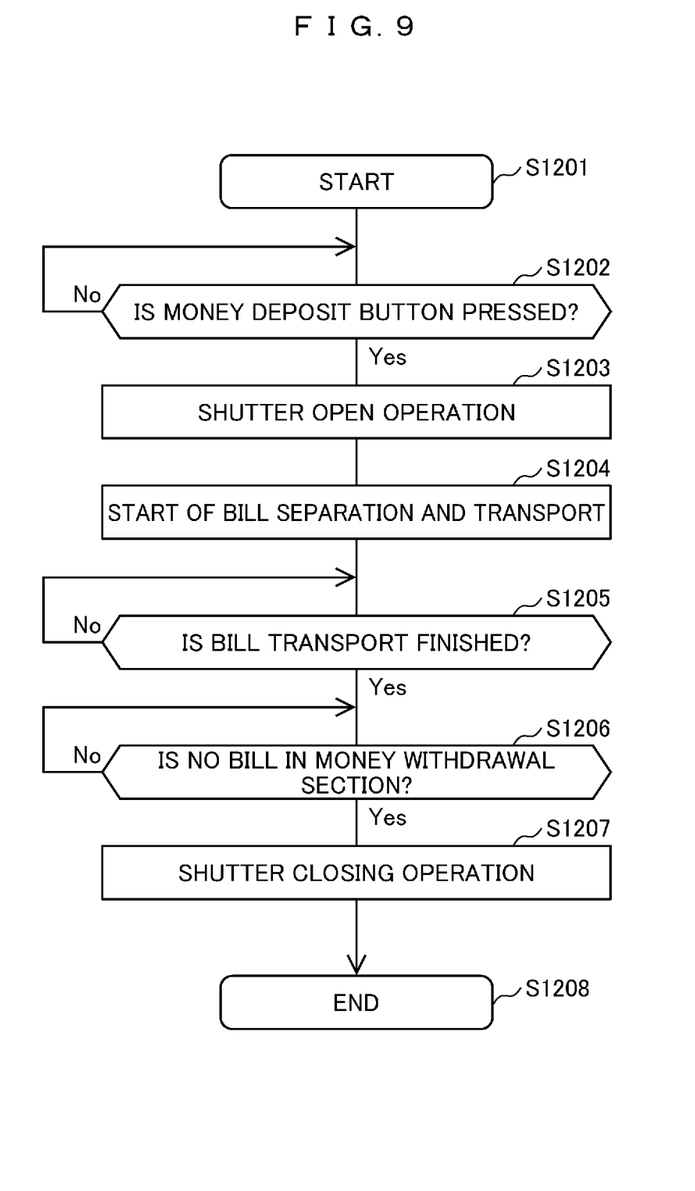
FIG. 9 is a control flow diagram of a money deposit transaction according to a second embodiment.

Another embodiment is explained hereunder. In the control of the shutter 150 explained in the first embodiment, when abnormality occurs in the opening operation of the shutter 150 (S1106) to cope with rejection during a money deposit transaction, the bill handling machine 100 stops in the state of not finishing money depositing transport, at least in the state where a bill judged as a reject note at the bill identification section 170 exists in the money withdrawal section 140, in the downstream side money withdrawal route 186, or in the downstream side money deposit route 182. The counter clerk M and the customer K therefore have to wait for the restoration of the bill handling machine 100. Further, when abnormality occurs in the above opening operation, a reject bill during a money deposit transaction may remain in a transport route in the front of the money withdrawal section 140 and the counting error of bills may occur in some cases. In the money deposit transaction therefore, the shutter 150 is opened immediately before the start of the separation of bills. The configuration of hardware in the second embodiment is assumed as the same as the first embodiment. A control (second control) flow of a money deposit transaction in the second embodiment is shown in FIG. 9. The operations and effects of opening the shutter 150 immediately before the start of the separation of bills are explained hereunder by taking a look at the flow of FIG. 9 in sequence.

When the bill handling machine 100 goes into a waiting state (S1201), the main control section 301 monitors the press of the money deposit button 114 (S1202). With the press of the money deposit button 114 by a customer, the main control section 301: controls the shutter 150 and the drive motor group 189; opens the shutter 150 (S1203); and starts the separation and transport of bills placed at the money deposit section 120 (S1204). The main control section 301 retains the open state of the shutter 150 during the transport of the bills. After the finish of the bill transport (Yes at S1205), the main control section 301 judges the presence or absence of a bill in the money withdrawal section 140 (S1206) and waits for all the reject bills transported to the money withdrawal section 140 to be taken out.

The main control section 301 closes the shutter 150 (S1207) when it judges that no bills exist in the money withdrawal section 140 (Yes at S1206). Successively, the main control section 301 finishes the transaction (S1208).

By the above operations, similarly to the first embodiment, a deposit-reject bill can be redeposited without waiting for the finish of bill transport. Further, even if abnormality occurs in an opening operation (S1203) of the shutter 150 and the bill handling machine 100 stops, the separation and transport of bills are not started yet. A counter clerk M or a customer K therefore can either take out bills in the money deposit section 120 and leave or carry out a money deposit transaction with another bill handling machine. Furthermore, even when the abnormality occurs, since the shutter 150 is in an open state before the start of the separation and transport of bills, the situation of leaving a reject bill in the transport route during a money deposit transaction in accordance with abnormality of opening operation of the shutter 150 is avoided and counting error of bills is no longer concerned.

Although the start of separating bills and a timing of opening the shutter 150 are judged by monitoring the press of the money deposit button 114 here, it is also possible to: not installing a money deposit button 114; and open the shutter 150 before the start of bill separation on the premise that the bill separation starts at the time when the control section 300 receives a money deposit instruction from an operation terminal P in FIG. 5 through the upper communication section 303.

Third Embodiment

Figure 10:
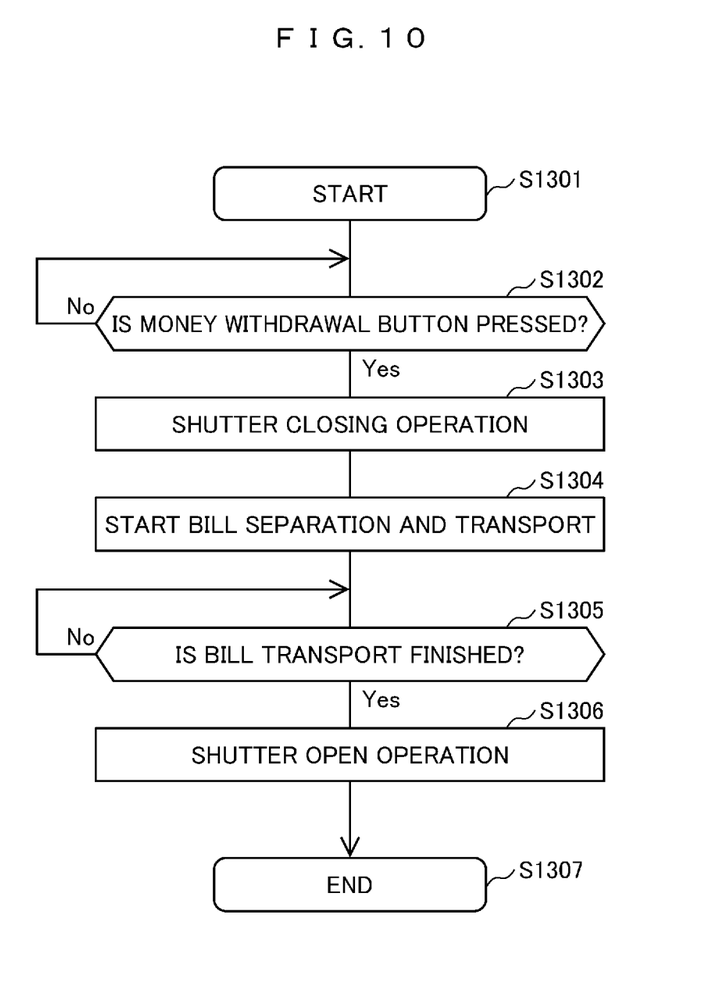
FIG. 10 is a control flow diagram of a money withdrawal transaction according to a third embodiment.

Still another embodiment is explained hereunder. The shutter 150 is closed basically and opened if necessary in the first and second embodiments. In contrast, the present embodiment is different on the point that the shutter 150 is opened basically. In the present embodiment, the shutter 150 is in an open state during bill transport or during wait and is closed immediately before the separation of bills starts in a money withdrawal transaction. The configuration of hardware in a third embodiment is regarded as the same as the first embodiment. A control (third control) flow of money withdrawal transaction in the third embodiment is shown in FIG. 10. The operations and effects of closing the shutter 150 immediately before the start of the separation of bills are explained hereunder by taking a look at the flow of FIG. 10 in sequence.

When the bill handling machine 100 goes into a waiting state (S1301), the main control section 301 monitors the press of the money withdrawal button 115 (S1302). With the press of the money withdrawal button 115 by a customer, the main control section 301: controls the shutter 150 and the drive motor group 189; closes the shutter 150 (S1303); and starts the separation and transport of bills from the bill storage section 200 (S1304). The main control section 301 retains the closed state of the shutter 150 during the transport of the bills. After the finish of bill transport (Yes at S1305), the main control section 301 opens the shutter 150 (S1306) and makes the state of being able to take out a bill from the money withdrawal section 140. Successively, the main control section 301 finishes the transaction (S1308).

By the above operations, during a money withdrawal transaction, a bill can be restrained from being taken out from the money withdrawal section 140 by a customer operation. Further, during a money deposit transaction, since the shutter 150 is always in an open state, it is possible to take out a reject bill at the time when the reject bill is transported to the money withdrawal section 140 and redeposit the reject bill into the money deposit section 120.

In each of the above embodiments, such control as stated above is carried out by installing a shutter of opening and closing in a money withdrawal section as means for permitting or restricting a customer operation to the money withdrawal section in a bill handling machine that has a money deposit section to deposit a bill and the money withdrawal section to withdraw a bill independently from each other and transports a reject bill to the money withdrawal section. By shifting the shutter installed in the money withdrawal section to a closed state during bill transport or during wait therefore, operations to the money withdrawal section in the middle of a transaction can be restricted and a bill is inhibited from being taken out during a money withdrawal transaction. Further, in a money deposit transaction, since the shutter is controlled so as to open at the timing of generating rejection, both the convenience of being able to take out and redeposit a reject bill immediately in a money deposit transaction and the restriction of operations to the money withdrawal section by installing the shutter can be ensured. In this way, takeout of a bill during a money withdrawal transaction can be restricted and operations of a customer-operated type can be materialized while the conventional convenience of being able to redeposit a deposit-reject bill immediately is maintained. In other words, it is possible to provide a bill handling machine capable of restraining a bill from being taken out during a money withdrawal transaction and, for counter services of a bank too, usable in the form of allowing a customer to directly operate like an ATM while the conventional convenience in money deposit and withdrawal transactions of being able to deposit a large amount of money and redeposit a deposit-reject bill immediately is maintained.

The present invention has heretofore been explained in reference to the drawings in detail but the present invention is not limited to the aforementioned various examples and can be modified variously within the range not departing from the tenor of the present invention. For example, although the present invention has been explained on the premise that either the first control in a money deposit transaction shown in FIG. 8 or the second control in a money deposit transaction shown in FIG. 9 is adopted in the bill handling machine 100, a configuration of being able to select those controls according to circumstances may be adopted.

Specifically, the main control section 301: may receive selection for carrying out the first control shown in FIG. 8 or the second control shown in FIG. 9 from the operation panel 118; and may carry out either of the controls in accordance with the selection. By adopting such a configuration, it is possible to switch and select suitable processing in accordance with the situation of a deposited bill. For example, when a deposited bill is stained or damaged, since the possibility of causing a reject bill is high, a counter clerk carries out processing by selecting the control of FIG. 9 so as not to generate abnormality in the opening operation of the shutter 150 and, when a deposited bill is in a state close to a new note, since the possibility of causing a reject bill is low, a counter clerk carries out processing by selecting the control of FIG. 8.

What is claimed is:

1. A bill handling machine to deposit and withdraw a bill with a customer over the counter, the bill handling machine comprising:
 a money deposit section having a money deposit opening to deposit the bill;
 a money withdrawal section arranged adjacently to the money deposit section and having a money withdrawal opening to withdraw the bill and a shutter to open and close the money withdrawal opening; and
 a controller configured to transport a reject bill to the money withdrawal opening,
 wherein the controller is configured to, in a money deposit transaction, carry out a first control of (i) closing the shutter during transport of the bill or during waiting, and (ii) opening the shutter at a timing of generating the reject bill, and
 wherein the controller is configured to permit the money deposit section to have the reject bill redeposited therein without waiting for the transport of the bill to finish, and
 wherein the controller is configured to cause reject bills and valid bills to be transported to a withdrawing bill reject box of a storage cassette of the money withdrawal section, and to permit a money withdrawal transaction to be retried.

2. The bill handling machine according to claim 1, wherein, the controller is configured to, in a money deposit transaction, carry out a second control of (i) closing the shutter during transport of the bill or during waiting, and (ii) opening the shutter before the bills deposited into the money deposit opening are separated and transported.

3. The bill handling machine according to claim 1, wherein the controller is configured to, in a money withdrawal transaction, carry out a third control of (i) closing the shutter before the bills are separated and transported from a bill storage section, and (ii) opening the shutter after transport of the bills finishes.

4. A bill handling method implemented with a bill handling machine to deposit and withdraw a bill with a customer over the counter, the bill handling method comprising the steps of:
 depositing the bill through a money deposit opening formed in a money deposit section;
 withdrawing the bill to a money withdrawal opening by opening and closing a shutter in a money withdrawal section arranged adjacently to the money deposit section; and
 transporting a reject bill to the money withdrawal opening,
 wherein, in a money deposit transaction, a first control of (i) closing the shutter during transport of the bill or during waiting, and (ii) opening the shutter at a timing of generating the reject bill is, carried out,
 wherein, in the money deposit transaction, permitting the money deposit section to have the reject bill redeposited therein without waiting for the transport of the bill to finish, and
 wherein the controller is configured to cause reject bills and valid bills to be transported to a withdrawing bill reject box of a storage cassette of the money withdrawal section, and to permit a money withdrawal transaction to be retried.

5. The bill handling method according to claim 4, wherein, in a money deposit transaction, a second control of (i) closing the shutter during transport of the bill or during waiting, and (ii) opening the shutter before the bills deposited into the money deposit opening are separated and transported is carried out.

6. The bill handling method according to claim 4, wherein, in a money withdrawal transaction, a third control of (i) closing the shutter before the bills are separated and transported from a bill storage section, and (ii) opening the shutter after transport of the bills finishes is carried out.

7. A bill handling machine to deposit and withdraw a bill with a customer over the counter, the bill handling machine comprising:
- a money deposit section having a money deposit opening to deposit the bill;
- a money withdrawal section arranged adjacently to the money deposit section and having a money withdrawal opening to withdraw the bill and a shutter to open and close the money withdrawal opening; and
- a controller configured to transport a reject bill to the money withdrawal opening,
- the controller configured to receive selection of either a first control of (i) closing the shutter during transport of the bill or during waiting, and (ii) opening the shutter at a timing of generating the reject bill in a money deposit transaction, or a second control of (iii) closing the shutter during transport of the bill or during waiting, and (iv) opening the shutter before the bills deposited into the money deposit opening are separated and transported in a money deposit transaction from an operation section; and
- the controller is configured to carry out either of the controls,
- wherein the controller is configured to permit the money deposit section to have the reject bill redeposited therein without waiting for the transport of the bill to finish, and
- wherein the controller is configured to cause reject bills and valid bills to be transported to a withdrawing bill reject box of a storage cassette of the money withdrawal section, and to permit a money withdrawal transaction to be retried.

* * * * *